(12) United States Patent
Lee et al.

(10) Patent No.: US 11,680,138 B2
(45) Date of Patent: Jun. 20, 2023

(54) POLYMER DISPERSION, METHOD FOR MANUFACTURING THE POLYMER DISPERSION, AND METHOD FOR MANUFACTURING POLYMER COMPOSITE FILM

(71) Applicant: Zhen Ding Technology Co., Ltd., Taoyuan (TW)

(72) Inventors: Kuan-Wei Lee, Taoyuan (TW); Szu-Hsiang Su, Taoyuan (TW); Shou-Jui Hsiang, Tayuan (TW); Pei-Jung Wu, Taoyuan (TW); Wei-Hsin Huang, Taoyuan (TW)

(73) Assignee: Zhen Ding Technology Co., Ltd., Taoyuan (TW)

(*) Notice: Subject to any disclaimer, the term of this patent is extended or adjusted under 35 U.S.C. 154(b) by 322 days.

(21) Appl. No.: 17/114,988

(22) Filed: Dec. 8, 2020

(65) Prior Publication Data

US 2022/0169789 A1   Jun. 2, 2022

(30) Foreign Application Priority Data

Nov. 27, 2020  (CN) .......................... 202011365021.5

(51) Int. Cl.
*C08G 69/26* (2006.01)
*C08L 67/03* (2006.01)
(Continued)

(52) U.S. Cl.
CPC ........... *C08G 69/265* (2013.01); *C08G 69/32* (2013.01); *C08J 3/096* (2013.01); *C08J 3/11* (2013.01); *C08J 5/18* (2013.01); *C08L 67/03* (2013.01); *C08K 2201/005* (2013.01); *C08L 2201/56* (2013.01); *C08L 2203/16* (2013.01);
(Continued)

(58) Field of Classification Search
CPC ............. C08L 2203/20; C08L 2205/12; C08L 2312/00; C08L 79/08; C08L 67/00; C08L 83/10; C08J 2379/08; C08G 73/1071; C08G 73/1078
See application file for complete search history.

(56) References Cited

U.S. PATENT DOCUMENTS

2011/0118422 A1* 5/2011 Akiike .................. C09K 19/56
427/532
2021/0087319 A1* 3/2021 Lee ....................... C08F 293/00

FOREIGN PATENT DOCUMENTS

WO    WO-2010035719 A1 * 4/2010 ......... C08G 73/1042

* cited by examiner

*Primary Examiner* — Mark S Kaucher
(74) *Attorney, Agent, or Firm* — ScienBiziP, P.C.

(57) ABSTRACT

A polymer dispersion is disclosed. The polymer dispersion includes a liquid crystal polymer powder, a polyamide acid, and a solvent. A solid content of the polymer dispersion includes the liquid crystal polymer powder and the polyamide acid. The liquid crystal polymer powder has a mass ratio of 20% to 30% in the solid content. The polyamide acid has a mass ratio of 70% to 80% in the solid content. The polyamide acid is obtained by mixing two kinds of diamines and two kinds of dianhydrides together, causing the diamines and the dianhydrides to be polymerized with each other. Both two kinds of diamines and two kinds of dianhydrides comprise a liquid crystal structure and a flexible structure respectively. A method of preparing the polymer dispersion, and a method for preparing a polymer composite film using the polymer dispersion are also disclosed.

14 Claims, 4 Drawing Sheets

(51) Int. Cl.
   *C08G 69/32* (2006.01)
   *C08J 3/09* (2006.01)
   *C08J 3/11* (2006.01)
   *C08J 5/18* (2006.01)
(52) U.S. Cl.
   CPC ....... *C08L 2203/20* (2013.01); *C08L 2205/12* (2013.01); *C08L 2312/00* (2013.01)

POLYMER DISPERSION, METHOD FOR MANUFACTURING THE POLYMER DISPERSION, AND METHOD FOR MANUFACTURING POLYMER COMPOSITE FILM

FIELD

The subject matter herein generally relates to a polymer dispersion, a method for manufacturing the polymer dispersion, and a method for manufacturing a polymer composite film.

BACKGROUND

Signal transmission attenuation in a circuit board is partly caused by a dielectric layer of the circuit board. The signal transmission attenuation is related to a dielectric constant and a dielectric loss factor of the dielectric layer. Therefore, the dielectric constant and the dielectric loss factor of the dielectric layer needs to be reduced.

Liquid crystal polymer (LCP), which comprises a liquid crystal structure and a low dielectric loss factor, is widely used in the dielectric layer of the circuit board. However, a solid content and a viscosity of the LCP are very low. Thus, when using the LCP to manufacture the dielectric layer, the process needs to be solvent-free and under high temperature. Moreover, when the dielectric layer and a copper foil are pressed together to form a copper-clad laminate, an adhesion between the dielectric layer and the copper foil is weak.

BRIEF DESCRIPTION OF THE DRAWINGS

Implementations of the present disclosure will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better. The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising" when utilized, means "including, but not necessarily limited to"; it specifically indicates open-ended inclusion or membership in the so-described combination, group, series, and the like.

The present disclosure provides a polymer dispersion, which comprises a liquid crystal polymer (LCP) powder, a polyamide acid, and a solvent. The liquid crystal polymer powder and the polyamide acid form a solid content of the polymer dispersion. The LCP powder has a mass ratio of 20% to 30% in the solid content of the polymer dispersion. The polyamide acid has a mass ratio of 70% to 80% in the solid content of the polymer dispersion. The polyamide acid is obtained by mixing two kinds of diamines and two kinds of dianhydrides together, causing the diamines and the dianhydrides to be polymerized with each other. Both two kinds of diamines and two kinds of dianhydrides comprise a liquid crystal structure and a flexible structure respectively.

In an embodiment, an average particle size of the LCP powder is less than or equal to 3 μm. Thus, a contact area between the LCP powder and the polyamide acid is increased, and the LCP powder can be uniformly dispersed in the polymer dispersion. The polymer dispersion may generate precipitation if the average particle size of the LCP powder is too large. Moreover, the LCP powder cannot melt completely if the average particle size of the LCP powder is too large, which may affect the film-forming properties of the polymer dispersion. A thickness of the film formed by the polymer dispersion is not uniform.

In an embodiment, the solid content has a mass ratio of 25% to 35% in the polymer dispersion. A viscosity of the polymer dispersion is in a range of 40000 cps to 50000 cps. The LCP powder is insoluble but can be dispersed in the solvent. Thus, the viscosity and a stability of the polymer dispersion are improved. Thus, the film-forming properties of the polymer dispersion are improved.

In an embodiment, the LCP powder may be, but is not limited to, an aromatic liquid crystal polyester.

In an embodiment, the solvent is a polar solvent, which may be, but is not limited to, N-methyl pyridoxerane (NMP).

Figure 1:
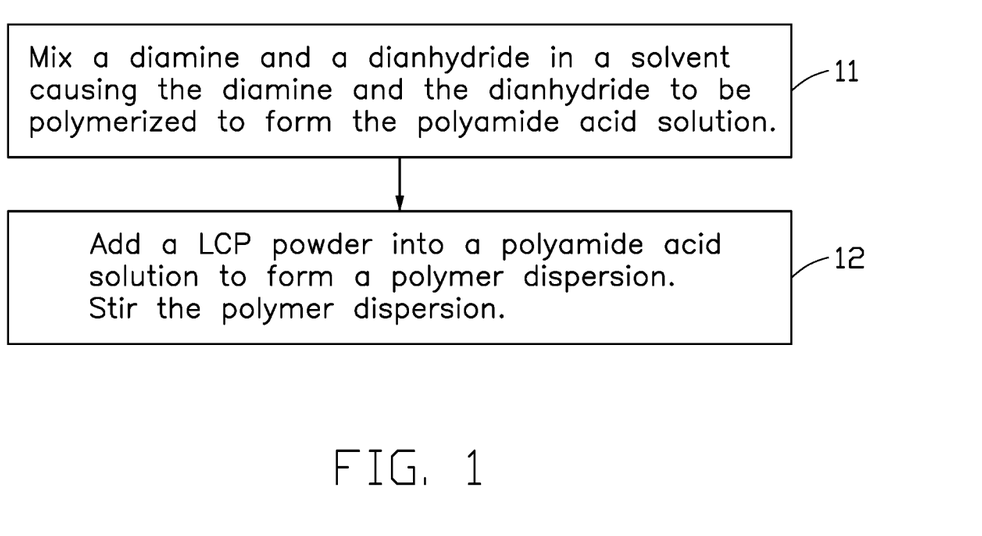
FIG. 1 is a flowchart of a method for manufacturing a polymer dispersion according to the present disclosure.

FIG. 1 illustrates a flowchart of a method for manufacturing the polymer dispersion. The method for manufacturing the polymer dispersion is provided by way of example, as there are a variety of ways to carry out the method. The method can begin at block 11.

Block 11, two kinds of diamines and two kinds of dianhydrides are mixed in a solvent, causing the diamines and the dianhydrides to be polymerized to form the polyamide acid solution.

both two kinds of the diamines and two kinds of the dianhydrides comprise the liquid crystal structure and the flexible structure.

In an embodiment, the diamine with the liquid crystal structure comprises at least one of p-aminobenzoate (APAB), 1,4-bis (4-aminophenoxy) benzene (ABHQ), and di-p-aminophenyl terephthalate (BPTP). The diamine with the flexible structure comprises at least one of 4,4'-oxydianiline (ODA), 4,4'-(4,4'-isopropylidenediphenyl-1,1'-diyldioxy)dianiline (BAPP), 4,4'-(1,3-phenylenedioxy)dianiline (TPE-R), and 1,3-bis(3-aminophenoxy)benzene (TPE-M).

In an embodiment, the dianhydride with the liquid crystal structure comprises at least one of 3,3,4,4'-biphenyltetrac- arboxylic dianhydride (BPDA), p-phenylene bis(trimellitate) dianhydride (TAHQ), and cyclohexane-1,4-diylbis(methylene)bis(1,3-dioxo-1,3-dihy-droisobenzofuran-5-carboxy late) (TA-CHDM). The dianhydride with the flexible structure comprises at least one of 4,4'-oxydiphthalic anhydride (ODPA), and 4,4'-(4,4'-isopropylidenediphenoxy)bis-(phthalic anhydride) (BPADA).

In an embodiment, a mass ratio of the diamines and the dianhydrides is 1:1.

In an embodiment, the diamines and the dianhydrides are polymerized under room temperature for about 48 hours to form the polyamide acid solution. The polyamide acid forms a solid content of the polyamide acid solution. The solid content has a mass ratio of 20% to 30% in the polyamide acid solution.

In an embodiment, the polyamide acid is obtained by mixing two kinds of diamines and two kinds of dianhydrides together, causing the diamines and the dianhydrides to be polymerized with each other randomly. The polyamide acid may be comprises a series of molecular structures. A probable molecular structure of the polyamide acid is expressed by N-M-X-Y. Wherein, two adjacent structures among structure N, structure M, structure X, and structure Y are connected by chemical bonds.

A probable molecular structure of the structure N is as follow.

A probable molecular structure of the structure X is as follow.

A probable molecular structure of the structure Y is as follow.

a probable molecular structure of the structure Y is as follows.

Block 12, the LCP powder is added into the polyamide acid solution to form the polymer dispersion. The polymer dispersion is stirred.

The LCP powder and the polyamide acid form a solid content of the polymer dispersion. The LCP powder has a mass ratio of 20% to 30% in the solid content of the polymer dispersion. The polyamide acid has a mass ratio of 70% to 80%A) in the solid content of the polymer dispersion.

Figure 2:
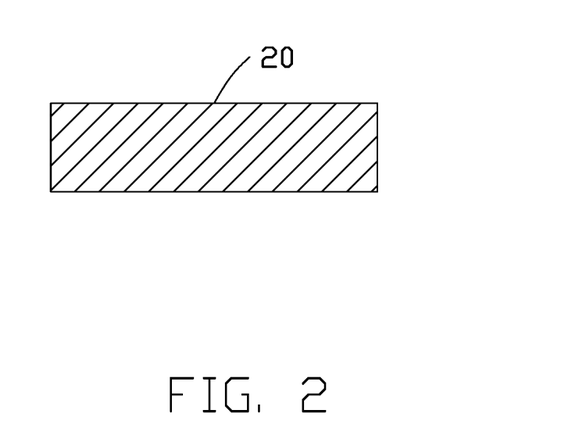
FIG. 2 is a diagrammatic view of polymer composite film according to the present disclosure.

Referring to FIG. 2 the present disclosure further provides a polymer composite film 20, which is formed by heating the polymer dispersion.

Figure 3A:
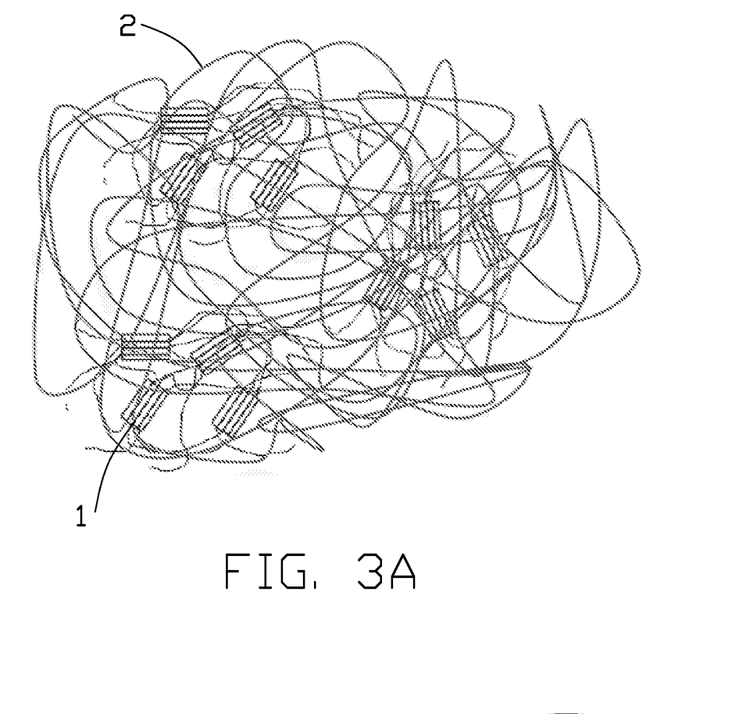
FIGS. 3A, and 3B are diagrammatic views showing a crystallization process of a polymer dispersion when heated.
Figure 3B:
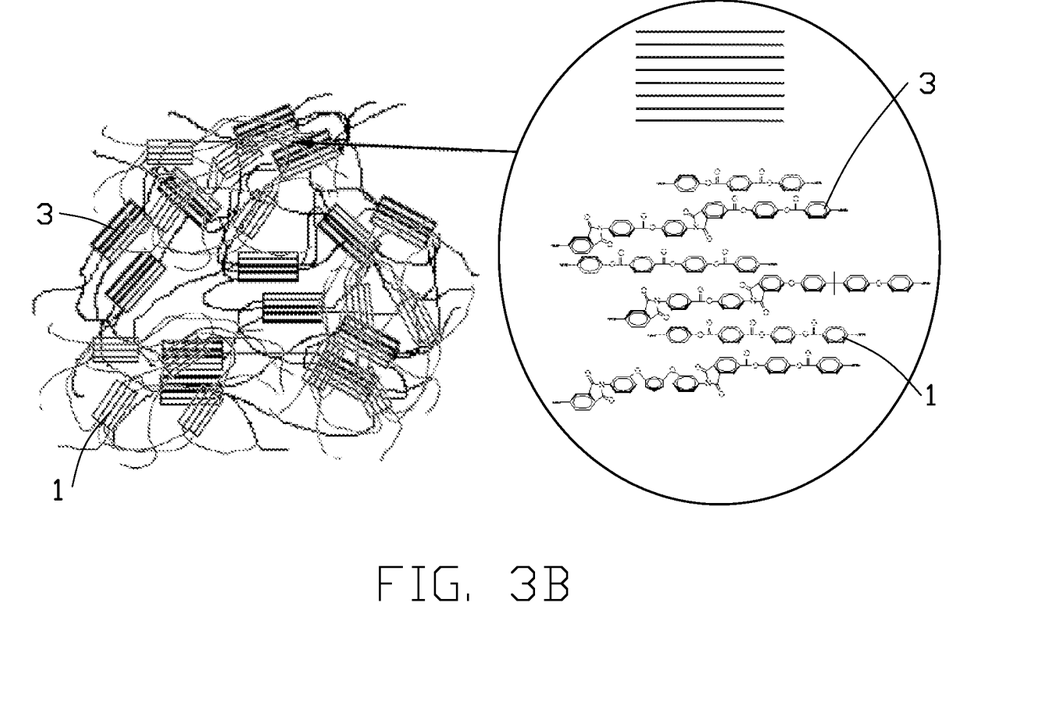

FIGS. 3A and 3B are diagrammatic views showing a crystallization process of the polymer dispersion when heated. As shown in FIG. 3A, a liquid crystal polymer crystalline 1 of the LCP powder melts to form a flowing melted LCP. The polyamide acid 2 is cyclized to form a melted polyimide. The melted LCP and the melted polyimide are mixed uniformly. The melted LCP comprises a liquid crystal structure (for example, ester group). The melted polyimide also comprises a liquid crystal structure (for example, ester group). As shown in FIG. 3B, the melted LCP is crystallized in a subsequent cooling process to form the liquid crystal polymer crystalline 1 again. The melted polyimide is crystallized in the cooling process to form a polyimide crystalline 3. As shown in FIG. FIG. 3B, the liquid crystal polymer crystalline 1 and the polyimide crystalline 3 are cross-linked to form a network structure. The network structure can improve mechanical and electrical properties of the polymer composite film. A thermal expansion coefficient (CTE) of the polymer composite film is reduced, which improves the stability of the polymer composite film. In addition, directions of the liquid crystal polymer crystalline 1 and the polyimide crystalline 3 in the network structure are anisotropic, which results in an anisotropic property of the polymer composite film.

In an embodiment, the amount of the liquid crystal polymer crystalline 1 and the polyimide crystalline 3 can be controlled by adjusting the amount of the LCP powder and the polyamide acid in the polymer dispersion. The mechanical and the electrical properties of the polymer composite film can be controlled by adjusting the amount of the liquid crystal polymer crystalline 1 and the polyimide crystalline 3. In addition, the mechanical and electrical properties of the polymer composite film can be further controlled by adjusting the amount and the distribution of the liquid crystal structures in the polyamide acid.

In an embodiment, the liquid crystal polymer crystalline 1 has a mass ratio of 20% to 30% in the polymer composite film.

In an embodiment, the polymer dispersion is heated at a temperature in a range of 350 Celsius degrees to 370 Celsius degrees, for a time period in a range of 30 min to 60 min. The temperature can be changed according to a glass transition temperature (Tg) of the polymer dispersion.

In an embodiment, the CTE of the polymer composite film is less than or equal to 45 ppm/Celsius degrees. A tensile strength of the polymer composite film is greater than or equal to 130 Mpa. A elongation of the polymer composite film is greater than or equal to 18%.

Figure 4:
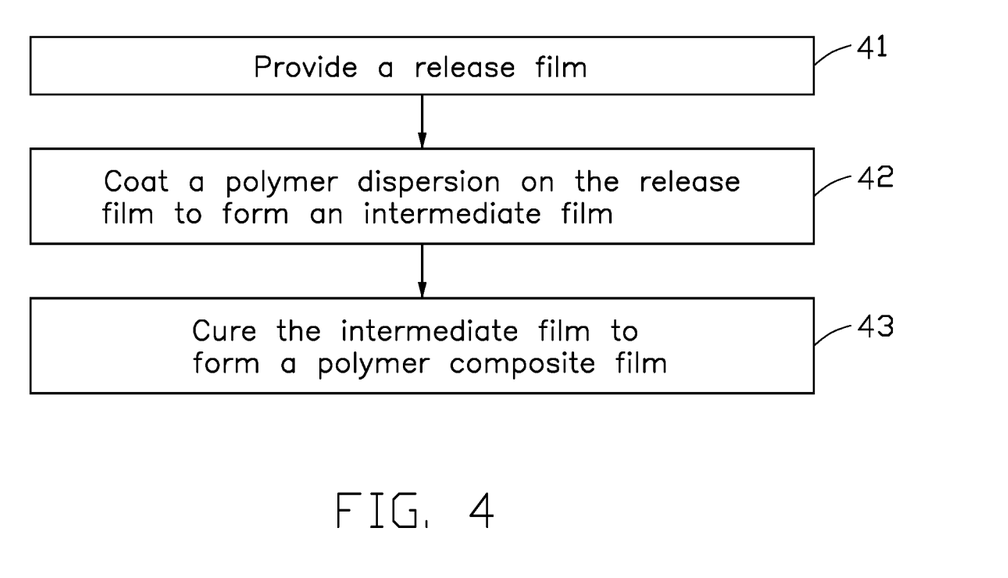
FIG. 4 is a flowchart of a method for manufacturing a polymer composite film according to the present disclosure.

FIG. 4 illustrates a flowchart of a method for manufacturing the polymer composite film according to an embodiment. The method for manufacturing the polymer composite film is provided by way of example, as there are a variety of ways to carry out the method. The method can begin at block 41.

Block 41, a release film is provided.

Block 42, the polymer dispersion is coated on the release film to form an intermediate film.

Block 43, the intermediate film is cured to form the polymer composite film.

In an embodiment, a thickness of the polymer composite is greater than or equal to 50 µm.

Block 44, the polymer composite film is removed from the release film.

In an embodiment, the intermediate film is cured at a temperature in a range of 350 Celsius degrees to 370 Celsius degrees, for a time period in a range of 30 min to 60 min.

Figure 6A:
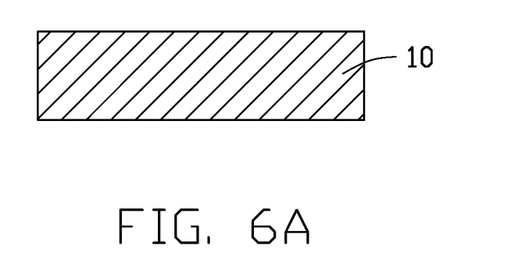
FIGS. 6A, 6B, and 6C are diagrammatic views of a method for manufacturing a copper-clad laminate.
Figure 6B:
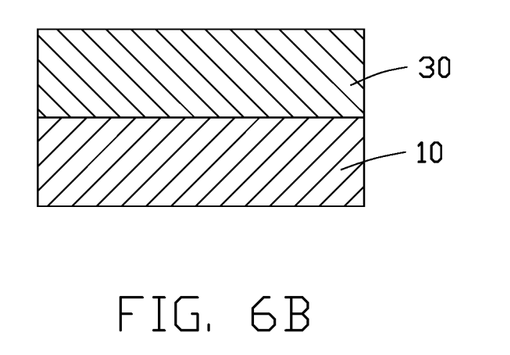
Figure 6C:
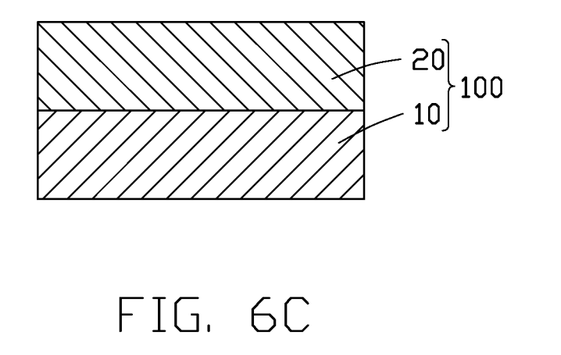

Referring to FIG. 6C, the present disclosure further provides a copper-clad laminate 100 (CCL), which comprises a copper foil 10 and the polymer composite film 20 on the copper foil 10.

In an embodiment, the CCL 100 has excellent electrical properties. An electrical property test at 10 GHz shows that the CCL has an excellent dielectric loss factor (DF) and an excellent dielectric constant (DK). The DF is in a range of 3.3 to 3.2. The DF is in a range of 0.002 to 0.001.

In an embodiment, a release force of the polymer composite film 20 is greater than or equal to 0.7 kgf/cm. In a heat resistance test, the polymer composite film 20 has a good heat resistance at 288 Celsius degrees/10 sec.

Figure 5:
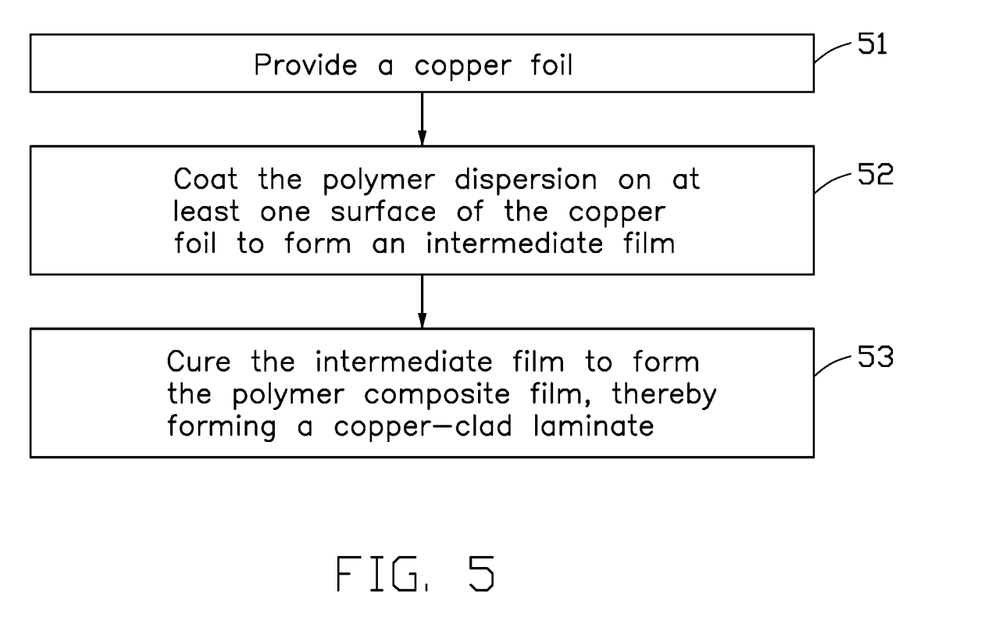
FIG. 5 is a flowchart of a method for manufacturing a copper-clad laminate.

FIG. 5 illustrates a flowchart of an embodiment of a method for manufacturing the CCL 100 with the polymer dispersion. The method for manufacturing the copper-clad laminate is provided by way of example, as there are a variety of ways to carry out the method. The method can begin at block 51.

Block 51, referring to FIG. 6A, a copper foil 10 is provided.

In an embodiment, a thickness of the copper foil 10 is about 12 µm.

Block 52, referring to FIG. 6B, the polymer dispersion is coated on at least one surface of the copper foil to form an intermediate film 30.

Block 53, referring to FIG. 6C, the intermediate film 30 is cured to form the polymer composite film 20, thereby forming the CCL 100.

In an embodiment, a thickness of the polymer composite film 20 is greater than or equal to 50 μm.

In an embodiment, the intermediate film 30 is cured at a temperature in a range of 350 Celsius degrees to 370 Celsius degrees, for a time period in a range of 30 min to 60 min.

In another embodiment, the CCL 100 can also be made by stacking the polymer composite film 20 on the copper foil 10, and pressing the polymer composite film 20 and the copper foil 10 together.

In an embodiment, the polymer composite film 20 and the copper foil 10 are pressed at a temperature in a range of 350 Celsius degrees to 370 Celsius degrees, for a time period in a range of 10 min to 30 min. The polymer composite film 20 and the copper foil 10 are pressed under a pressure in a range of 30 kgf/mm$^2$ to 80 kgf/mm$^2$.

In another embodiment, the CCL 100 can also be a double-sided copper-clad laminate substrate with copper foil 10 attached to both sides of the polyimide composite film 20.

Synthetic Example 1

NMP (243.8 g) and TPE-M (0.1 mol, 29.23 g) were added into a 500 ml container to form a first mixture. The first mixture was stirred. BPADA (0.1 mol, 52.05 g) was added in the first mixture to form a second mixture. The second mixture was stirred for 48 h to form the polyamide acid solution.

Synthetic Example 2

NMP (205.97 g) and APAB (0.1 mol, 22.83 g) were added into a 500 ml container to form a first mixture. The first mixture was stirred. TAHQ (0.1 mol, 45.83 g) was added in the first mixture to form a second mixture. The second mixture was stirred for 48 h to form the polyamide acid solution.

Synthetic Example 3

NMP (225.20 g) and TPE-M (0.1 mol, 29.2 g) were added into a 500 ml container to form a first mixture. The first mixture was stirred. TAHQ (0.1 mol, 45.83 g) was added in the first mixture to form a second mixture. The second mixture was stirred for 48 h to form the polyamide acid solution.

Synthetic Example 4

NMP (224.62 g) and APAB (0.1 mol, 22.83 g) were added into a 500 ml container to form a first mixture. The first mixture was stirred. BPADA (0.1 mol, 52.05 g) was added in the first mixture to form a second mixture. The second mixture was stirred for 48 h to form the polyamide acid solution.

Synthetic Example 5

NMP (224.91 g), TPE-M (0.05 mol, 14.61 g) and TAHQ (0.05 mol, 22.93 g) were added into a 500 ml container to form a first mixture. The first mixture was stirred for 1 h. APAB (0.05 mol, 14.61 g) and BPADA (0.05 mol, 26.02 g) were added in the first mixture to form a second mixture. The second mixture was stirred for 48 h to form the polyamide acid solution.

Two kinds of components which used to form the polyamide acid solution are shown in Table 1. Five CCLS manufactured by the above-mentioned method in FIG. 5 with a dispersion synthesized by Synthetic Examples 1-5. Test results of corresponding CCLS are also shown in Table 1. PGP-25,T1

TABLE 1

|  | Synthetic Example 1 | Synthetic Example 2 | Synthetic Example 3 | Synthetic Example 4 | Synthetic Example 5 |
| --- | --- | --- | --- | --- | --- |
| Diamine (APAB, mol %) | — | 50 | — | 50 | 25 |
| Diamine (TPE-M, mol %) | 50 | — | 50 | — | 25 |
| Dianhydride (TAHQ, mol %) | — | 50 | 50 | — | 25 |
| Dianhydride (BPADA, mol %) | 50 | — | — | 50 | 25 |
| Liquid crystal structure | No | Yes | Yes | Yes | Yes |
| Viscosity (cps) | 20000~30000 | 40000~50000 | 40000~50000 | 40000~50000 | 40000~50000 |
| Release force (kgf/cm) | 1.3 | 0.27 | 0.81 | 0.93 | 1.33 |
| Ts (Celsius degree) | 230 | >400 | 335 | 310 | 769 |
| CTE (ppm/Celsius degree) | 71.1 | 13.5 | 29.3 | 38.1 | 57.1 |
| Film forming property (no hole) | PASS | PASS | PASS | PASS | PASS |
| Tensile strength (MPa) | 85 | 213 | 167 | 142 | 110 |
| Elongation (%) | 19.3 | 5.3 | 8.9 | 10.1 | 15.1 |
| Solder Float Test (288 Celsius degree/10s) | NG | PASS | PASS | PASS | PASS |
| Dk (10 GHz) | 3.4 | 3.3 | 3.3 | 3.2 | 3.0 |
| Df (10 GHz) | 0.018 | 0.002 | 0.006 | 0.009 | 0.003 |

The Ts is a thermal processing temperature of the polyimide, which is between a glass transition temperature (Tg) and a melting temperature (Tm) of the polyimide (or equal to Tm).

Example 1

The polyimide solution (10 g) obtained by synthetic example 5 and the LCP powder (LF31-P, 0.625 g) were added into a 100 ml container to form a mixture. The mixture was stirred for about 6 hours to form the polymer dispersion.

Example 2

The polyimide solution (10 g) obtained by synthetic example 5 and the LCP powder (LF31-P, 0.833 g) were added into a 100 ml container to form a mixture. The mixture was stirred for about 6 hours to form the polymer dispersion.

Example 3

The polyimide solution (10 g) obtained by synthetic example 5 and the LCP powder (LF31-P, 1.07 g) were added into a 100 ml container to form a mixture. The mixture was stirred for about 6 hours to form the polymer dispersion.

Components which used to form the polymer dispersion are shown in Table 2. An amount of the component in the polymer dispersion is a percentage of solid content of the polymer dispersion. Three CCLS manufactured by the above-mentioned method in FIG. 5 with a dispersion synthesized by Examples 1-3. Test results of corresponding CCLS are also shown in Table 2.

TABLE 2

|  | Example 1 | Example 2 | Example 3 |
| --- | --- | --- | --- |
| LF31-P (wt. %) | 20 | 25 | 30 |
| Synthetic example 2 (wt. %) |  |  |  |
| Synthetic example 3 (wt. %) |  |  |  |
| Synthetic example 4 (wt. %) |  |  |  |
| Synthetic example 5 (wt. %) | 80 | 75 | 70 |
| Liquid crystal structure | Yes | Yes | Yes |
| Viscosity (cps) | 40000~50000 | 40000~50000 | 40000~50000 |
| Release force (kgf/cm) | 0.93 | 0.85 | 0.78 |
| CTE (ppm/Celsius degree) | 43.2 | 37.2 | 31.2 |
| Film forming property (no hole) | PASS | PASS | PASS |
| Tensile strength (MPa) | 133 | 140 | 145 |
| Elongation (%) | 18.3 | 18.9 | 19.6 |
| Solder Float Test (288 Celsius degree/10s) | PASS | PASS | PASS |
| Dk (10 GHz) | 3.2 | 3.3 | 3.3 |
| Df (10 GHz) | 0.002 | 0.001 | 0.001 |

Comparative Example 1

The NMP (31.5 g) and the LCP powder (LF31-P, 3.5 g) were added into a 100 ml container to form a mixture. The mixture was stirred for about 6 hours to form the LCP dispersion.

Comparative Example 2

The polyamide acid solution (10 g) obtained by Synthetic Example 1 and the LCP powder (LF31-P, 0.625 g) were added into a 100 ml container to form a mixture. The mixture was stirred for about 6 hours to form the polymer dispersion.

Comparative Example 3

The polyimide solution (10 g) obtained by synthetic example 2 and the LCP powder (LF31-P, 0.625 g) were added into a 100 ml container to form a mixture. The mixture was stirred for about 6 hours to form the polymer dispersion.

Comparative Example 4

The polyimide solution (10 g) obtained by synthetic example 3 and the LCP powder (LF31-P, 0.625 g) were added into a 100 ml container to form a mixture. The mixture was stirred for about 6 hours to form the polymer dispersion.

Comparative Example 5

The polyimide solution (10 g) obtained by synthetic example 4 and the LCP powder (LF31-P, 0.625 g) were added into a 100 ml container to form a mixture. The mixture was stirred for about 6 hours to form the polymer dispersion.

Comparative Example 6

The polyimide solution (10 g) obtained by Synthetic Example 4 and the LCP powder (LF31-P, 1.07 g) were added into a 100 ml container to form a mixture. The mixture was stirred for about 6 hours to form the polymer dispersion.

Comparative Example 7

The polyamide acid solution (10 g) obtained by Synthetic Example 5 and the LCP powder (LF31-P, 0.441 g) were added into a 100 ml container to form a mixture. The mixture was stirred for about 6 hours to form the polymer dispersion.

Comparative Example 8

The polyamide acid solution (10 g) obtained by Synthetic Example 5 and the LCP powder (LF31-P, 1.35 g) were added into a 100 ml container to form a mixture. The mixture was stirred for about 6 hours to form the polymer dispersion.

Components which used to form the polymer dispersion are shown in Table 3. An amount of the component in the polymer dispersion is a percentage of solid content of the polymer dispersion. Eight CCLS manufactured by the above-mentioned method in FIG. 5 with a dispersion were synthesized by Comparative Examples 1-8. Test results of corresponding CCLS are also shown in Table 3.

TABLE 3

| | Com. Example 1 | Com. Example 2 | Com. Example 3 | Com. Example 4 | Com. ExamPle 5 | Com. ExamPle 6 | Com. ExamPle 7 | Com. ExamPle 8 |
|---|---|---|---|---|---|---|---|---|
| LF31-P (wt. %) | 100 | 20 | 20 | 20 | 20 | 30 | 15 | 35 |
| Synthetic example 1 (wt. %) | — | 80 | | | | | — | — |
| Synthetic example 2 (wt. %) | | | 80 | | | | | |
| Synthetic example 3 (wt. %) | | | | 80 | | | | |
| Synthetic example 4 (wt. %) | | | | | 80 | 70 | | |
| Synthetic example 5 (wt. %) | — | — | | | | | 85 | 65 |
| Liquid crystal structure | Yes | No | Yes | Yes | Yes | Yes | Yes | Yes |
| Viscosity (cps) | 3350 | 20000~30000 | 40000~50000 | 40000~50000 | 40000~50000 | 40000~50000 | 40000~50000 | 40000~50000 |
| Release force (kgf/cm) | — | 0.13 | 0.21 | 0.64 | 0.71 | 0.53 | 1.1 | 0.65 |
| CTE (ppm/Celsius degree) | — | 62.1 | 10.3 | 21.3 | 29.2 | 23.2 | 48.1 | 29.5 |
| Film forming property no hole) | Cannot be filmed. | PASS | PASS | PASS | PASS | PASS | PASS | PASS |
| Tensile strength (Mpa) | — | 57 | 223 | 180 | 161 | 175 | 127 | 151 |
| Elongation (%) | — | 2.5 | 7.1 | 10.1 | 12.5 | 13.1 | 17.1 | 19.8 |
| Solder Float Test (288 Celsius degree/10 s) | — | NG | PASS | PASS | PASS | PASS | PASS | PASS |
| Dk (10 GHz) | 3.5 | 3.4 | 3.4 | 3.4 | 3.3 | 3.4 | 3.2 | 3.4 |
| Df (10 GHz) | 0.0007 | 0.011 | 0.002 | 0.003 | 0.005 | 0.003 | 0.003 | 0.001 |

A ratio of the LCP powder in Tables 2-3 is calculated by a mass ratio of the LCP powder in the solid content of the polymer dispersion.

The LF31-P in tables 2-3 is purchased from Nippon Oil & Energy Corporation (IXTG).

In table 3, the Com. is the abbreviation of comparative.

The average particle size of the LCP powder was tested based on the ASTM D1210 standard.

The release force was tested based on IPC-TM650 2.4.9 standard.

The solder float test was tested based on IPC-TM650 2.4.13 standard.

The tensile test was tested based on ASTM D638 standard.

From Table 3, the LCP dispersion with LF31-P powder cannot form a film.

From Table 1, compared Synthetic Example 1 with Synthetic Examples 2-5, the CCLS with polyimide films according to Synthetic Examples 2-5 have a lower Df. This is because the polyamide acid synthesized by Synthetic Example 1 has no liquid crystal structure, and the polyamide acids synthesized by Synthetic Examples 2-5 have liquid crystal structure. With the increasing amount of the liquid crystal structure, the lower Df and better electrical properties of the CCL are obtained. From the Synthetic Example 2 and Synthetic Examples 3-5, the CCL with polyimide film according to synthetic example 2 has a lower Df but higher Dk, compared with the CCLS with polyimide films according to Synthetic Examples 3-5. This is because both the diamine (APAB) and the dianhydride (TAHQ) comprise the liquid crystal structure, and the amount of the liquid crystal structure in Synthetic Example 2 is the largest. However, with the increasing amount of liquid crystal structure, the release force of the polyimide film on the CCL is reduced. This is because with the increasing amount of the liquid crystal structure, an adhesive force between the polyimide film and the cooper foil is reduced. From the Synthetic Examples 3-5, the polyamide acid comprises the flexible structure. The CCLS have a lower Dk but higher Df. In addition, with the adding of the flexible structure in the polyamide acid, the higher release force of the polyimide film on the CCL is resulted. From the Synthetic Example 5, both the diamine and dianhydride comprise liquid crystal structures and flexible structures, which results in a lower Df, Dk of the CCLS. Besides, the diamine and dianhydride are uniformly dispersed when they are successively added which results in a lower Df, Dk, and a higher release force of the CCLS.

Compared with Synthetic Example 5, Examples 1-3 the addition of the LF31-P powder (average particle size <3 μm, mass ratio of 20 wt % ~30 wt %) in the polymer dispersion causes a decrease of the Df and the Dk of the CCL. With the increasing amount of the LF31-P powder the Df of the CCL is decreased. The release force and the CTE of the polymer composite film are ideal. Moreover, the mechanical properties of the polymer composite film are increased. This is because, the polyamide acid in the polymer dispersion was synthesized by the Synthetic Example 5. The polyamide acid was synthesized by two kinds of diamines and two kinds of dianhydrides. Both two kinds of diamines and two kinds of dianhydrides comprise the liquid crystal structure and the flexible structure respectively. The liquid crystal structure can be cross-linked with the LF31-P powder to form a crosslinked network structure. The flexible structure in the polyamide acid may increase the freedom degree of a molecular, which may increase the release force and the CTE of the polymer composite film.

Compared with Example 1, although the same amount of LCP powder is added into the polymer dispersion in Comparative Examples 3-5, the Df or Dk of the CCL is higher, which is not reach a target value (Df≤0.002). The release force and the CTE of the polymer composite film are decreased. This is because the diamine and the dianhydride in Comparative Example 3 only comprise the liquid crystal structures, which result in reducing a freedom degree of a molecule of the polyamide acid. For polyamide acid in Comparative Examples 4-5, only one of the diamine and the dianhydride comprises the liquid crystal structures, which result in an unevenly distribution of the crystallines in the network structure. A number of physical crystal crosslinked points of LCP crystallines and polyimide crystallines is reduced, which result in a decreasing of the release force and the CTE of Comparative Examples 4-5. The Dk of the CCL is also increased. Compared with example 3, the amount of LCP powder is increased in Comparative Example 6, the mechanical properties are increased and the Df is decreased. But the release force is decreased and the Dk is increased. This is because only one of the diamine and the dianhydride used for preparing polyamide acid in Comparative Example 6 comprises liquid crystal structures, which result in an unevenly distribution of the crystal phase in the network structure.

From Comparative Example 2, the polyamide acid has no liquid crystal structure in its molecular chain, a poor compatibility between polyamide acid and LCP powder (LF31-P) is resulted, thereby the mechanical properties and release force of the polymer composite film are decreased.

Compared with Examples 1-3, the amount of the LCP powder in the polymer dispersion obtained by Comparative Example 7 is too little, a large Df are resulted. The amount of the LCP powder in the polymer dispersion obtained by Comparative Example 8 is too large, a large Dk and a low release force are resulted.

In summary, the LCP powder in the polymer dispersion can improve the solid content and viscosity of the polymer dispersion. The liquid crystal structure in the thermoplastic polyamide acid can improve the compatibility between the polyamide acid and the LCP powder, causing the polymer dispersion to have improved film-forming properties. The polymer composite film can thus have good stability. Two kinds of crystallines in the polymer composite film can form network structure, which improves the mechanical properties and the stability of the polymer composite film. The CCL can also have good electrical properties and CTE. The amounts of the liquid crystallines and the polyimide crystallines can be controlled by adjusting the amount of the LCP powder and the polyamide acid when preparing the polymer dispersion. The mechanical properties of the polymer composite film can be controlled by adjusting the amounts of the liquid crystal polymer crystalline and the polyimide crystalline. In addition, the mechanical and properties of the polymer composite film can be further controlled by adjusting the amount and distribution of the liquid crystal structures in the polyamide acid. The polymer composite film in the CCL has good adhesion with the copper foil, which result in excellent mechanical properties and a high release force.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A polymer dispersion, comprising:
    a liquid crystal polymer powder;
    a polyamide acid; and
    a solvent;
    wherein the liquid crystal polymer powder and the polyamide acid form a solid content of the polymer dispersion, the liquid crystal polymer powder has a mass ratio of 20% to 30% in the solid content, the polyamide acid has a mass ratio of 70% to 80% in the solid content; the polyamide acid is obtained by mixing two kinds of diamines and two kinds of dianhydrides together, causing the diamines and the dianhydrides to be polymerized with each other, both two kinds of diamines and two kinds of dianhydrides comprise a liquid crystal structure and a flexible structure respectively.

2. The polymer dispersion of claim 1, wherein an average particle size of the liquid crystal polymer powder is less than or equal to 3 μm.

3. The polymer dispersion of claim 1, wherein the solid content has a mass ratio of 25% to 35% in the polymer dispersion.

4. The polymer dispersion of claim 1, wherein a viscosity of the polymer dispersion is in a range of 40000 cps to 50000 cps.

5. The polymer dispersion of claim 1, wherein the liquid crystal polymer powder comprises an aromatic liquid crystal polyester.

6. The polymer dispersion of claim 1, wherein the solvent comprises a N-methyl pyridoxerane.

7. A method of preparing a polymer dispersion, comprising:
    providing a polyamide acid solution; and
    adding a liquid crystal polymer powder into the polyamide acid solution to form a polymer dispersion,
    wherein, the polyamide acid solution comprises a polyamide acid and a solvent, the liquid crystal polymer powder and the polyamide acid form a solid content of the polymer dispersion, the liquid crystal polymer powder has a mass ratio of 20% to 30% in the solid content, the polyamide acid has a mass ratio of 70% to 80% in the solid content, the polyamide acid is obtained by mixing two kinds of diamines and two kinds of dianhydrides together, causing the diamines and the dianhydrides to be polymerized with each other, both two kinds of diamines and two kinds of dianhydrides comprise a liquid crystal structure and a flexible structure respectively.

8. The method of claim 7, wherein an average particle size of the liquid crystal polymer powder is less than or equal to 3 μm.

9. The method of claim 7, wherein the solid content has a mass ratio of 25% to 35% in the polymer dispersion.

10. The method of claim 7, wherein a viscosity of the polymer dispersion is in a range of 40000 cps to 50000 cps.

11. The method of claim 7, wherein the liquid crystal polymer powder comprises an aromatic liquid crystal polyester.

12. The method of claim 7, wherein the solvent comprises a N-methyl pyridoxerane.

13. The method of claim 7, wherein the diamine with the liquid crystal structure comprises at least one of p-aminobenzoate, 1,4-bis (4-aminophenoxy) benzene, and di-p-aminophenyl terephthalate;

the diamine with the flexible structure comprises at least one of 4,4'-oxydianiline, 4,4'4,4'-isopropylidenediphenyl-1,1'-diyldioxy)dianiline, 4,4'-(1,3-Phenylenedioxy) dianiline, and 1,3-bis(3-aminophenoxy)benzene.

14. The method of claim 7, wherein the dianhydride with the liquid crystal structure comprises at least one of 3,3',4,4'-biphenyltetracarboxylic dianhydride, p-phenylene bis (trimellitate) dianhydride, and cyclohexane-1,4-diylbis (methylene)bis(1,3-dioxo-1,3-dihy-droisobenzofuran-5-carbo xylate);

the dianhydride with the flexible structure comprises at least one of 4,4'-oxydiphthalic anhydride, and 4,4'-(4, 4'-isopropylidenediphenoxy)bis-(phthalic anhydride).

* * * * *